United States Patent [19]

Wang et al.

[11] 3,864,480

[45] Feb. 4, 1975

[54] CINERUBIN A AND B AS ANTIPARASITIC AGENTS

[75] Inventors: Ching C. Wang, Watchung, N.J.; Justo Martinez Mata, Sebastian Hernandez, both of Madrid, Spain

[73] Assignee: Merck & Co., Inc., Rahway, N.J.

[22] Filed: May 6, 1974

[21] Appl. No.: 467,324

[52] U.S. Cl. .................................. 424/120, 424/121
[51] Int. Cl. ............................................. A61k 21/00
[58] Field of Search ........................... 424/120, 121

[56] References Cited
FOREIGN PATENTS OR APPLICATIONS
846,130   8/1960   Great Britain OTHER PUBLICATIONS
Chemical Abstracts, Vol. 71 (1969), p. 37257f.

*Primary Examiner*—Vincent D. Turner
*Attorney, Agent, or Firm*—Francis H. Deef; J. Jerome Behan; Edmunde D. Riedl

[57] ABSTRACT

Cinerubin A and B are active anti-coccidial agents. Either or both are included in compositions useful for the prevention and treatment of coccidiosis in poultry.

3 Claims, No Drawings

CINERUBIN A AND B AS ANTIPARASITIC AGENTS

SUMMARY OF THE INVENTION

This invention relates generally to the usefulness of Cinerubin A or B for the treatment and prophylactic prevention of coccidiosis in susceptible animals, especially in fowl and particularly poultry. In addition, this invention relates to compositions including said Cinerubin A or B or mixtures thereof as the active ingredient, intimately admixed with an inert carrier for administration to animals infected with coccidia. It is therefore an object of this invention to provide a method of treatment for coccidiosis using Cinerubin A or B. It is also an object of this invention to include either Cinerubin A or B or mixtures thereof in compositions for administration to poultry which compositions are employed in the treatment of coccidiosis. As used herein the term "treatment" includes administration to animals who have developed active symptoms of coccidiosis, as well as animals without overt symptoms, but that have been exposed to causative organisms. Further objects will become apparent on a further reading of the description.

Coccidiosis is a common and widespread animal disease caused by several species of protozoan parasites of the genus Eimeria. In chickens, implicated species include those such as E. tenella, E. necatrix, E. acervulina, E. maxima, E. hagani, and E. brunetti. E. tenella is the causative agent of a severe and often fatal infection of the caeca of chickens, which is manifested by severe and extensive hemorrhage, accumulation of blood in the caeca, and the passage of blood in the droppings. E. necatrix attacks the small intestine of the chick causing what is known as intestinal coccidiosis. Related species of coccidia such as E. meleagridis and E. adenoides are causative organisms of coccidiosis in turkeys. When left untreated, the severe forms of coccidiosis lead to poor weight gain, reduced feed efficiency and high mortality in fowl. The elimination or control of this disease is, therefore, of paramount importance to the poultry raising industry.

Cinerubin A and B are described in British Pat. No. 846,130, as well as Ettlinger et al., Chem. Berichte, V. 12, p. 1867 (1959), and Keller-Schierlein et al., Antimicrobial Agents and Chemotherapy (1970) 68.

Also included are the acid addition salts of Cinerubin A and Cinerubin B which can be formed by contacting Cinerubin A or B with a strong acid such as hydrohalic acid, e.g. hydrochloric and hydrobromic, sulfuric, nitric, and phosphoric acids as well as other acids that are sufficiently strong to protonate the basic cinerubin, and whose anion is non-toxic to poultry.

The cinerubin compounds hereinabove described, when used as coccidiostats in poultry may be administered orally as a component of the animal feedstuff, in the drinking water, in salt blocks, and in unit dosage forms such as tablets, boluses, or drenches; or parenterally either in solution or in suspension in an aqueous medium. The vehicle in which the active ingredient is distributed should be one that is chemically compatible with the particular compound selected, non-inhibiting with respect to the action of the coccidiostat and essentially non-toxic to the host animal under the conditions of use. The preferred embodiments of this invention are realized when the composition is orally administered to the animal as an adjunct to the animals normal feed.

Therefore, another preferred embodiment of this invention is compositions containing the above cinerubin compounds which may be successfully employed to treat coccidiosis when administered to poultry. The active compounds are conveniently fed to poultry as a component of the feed of the animals although they also may be given dissolved or suspended in the drinking water. According to a preferred aspect of the invention, novel compositions for the treatment of coccidiosis are provided which comprise Cinerubin A or Cinerubin B or mixtures thereof intimately dispersed in or intimately admixed with an inert edible carrier or diluent. By an inert edible carrier or diluent is meant one that is nonreactive with respect to the cinerubin and that may be administered with safety to the animals to be treated. The carrier or diluent is preferably one that is or may be an ingredient of the animal feed.

The compositions which are a preferred feature of this invention are the so-called feed supplements in which the Cinerubin A or B is present in relatively large amounts and which are suitable for addition to the poultry feed either directly or after an intermediate dilution or blending step. Examples of carriers or diluents suitable for such compositions are animal feed ingredients such as distillers'dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The cinerubin compound is intimately dispersed or admixed throughout the solid inert carrier by methods such as grinding, stirring, milling, or tumbling. By selecting proper diluents and by altering the ratio of carrier to active ingredient, compositions of any desired concentration may be prepared. Formulations containing from about 1 % to about 40 % by weight and preferably from about 2–25 % by weight, of a cinerubin are particularly suitable for addition to poultry feedstuffs. Those having from about 5–20 % by weight of the cinerubin coccidiostat are very satisfactory. The active compound is usually dispersed or mixed uniformly in the diluent but in some instances may be sorbed on the carrier. Since it is convenient for the feed manufacturer to use about one pound of feed supplement for each ton of finished feed, the preferred concentration in the supplement is usually a function of the level of active ingredient desired in the finished feed.

Usually the feed supplements are further diluted with materials such as corn meal or soybean meal before being incorporated in the animal feed. In this intermediate processing step, the level of the cinerubin coccidiostat in the carrier is brought down to about 0.1 to 1.0 % by weight. This dilution serves to facilitate uniform distribution of the coccidiostat in the finished feed. The finished feed is one that contains a source of fat, protein, carbohydrate, minerals, vitamins, and other nutritional factors.

In feed, very low levels of cinerubin in an animal's feed are sufficient to afford the animal good protection against coccidiosis. Preferably, the compound is administered, e.g., to chickens, in an amount equal to about 0.001 to 0.003% by weight of the daily feed intake. Optimum results are obtained by feeding at a level of about 0.001 to 0.003% by weight of the finished feed. For therapeutic treatment of an established coccidial infection, higher amounts of cinerubin compound, i.e., up to about 0.005% by weight of the feed consumed, may be employed. The most advantageous dosage level will, of course, vary somewhat with particular circumstances such as the type and severity of the coccidial infection to be treated, or if combined with another coccidiostat.

The above concentrations are described on the basis of crystalline material, that is, material which is substantially pure. It is to be understood that an equivalent amount of cinerubin A or B activity can be obtained by employing less pure material derived from any one or more of the various stages of cinerubin fermentation, including whole culture, filtered beer, or mycelia. For example, the filtered beer, without further purification, be spray dried directly out the inert carrier when employing such a source of activity, the material used is advisedly assayed and the quantity employed factored so it is equivalent to the above-referred to concentrations.

For treating poultry, the feed supplement is uniformly dispersed in the animal feed by suitable mixing or blending procedures.

In the above discussion of this invention, emphasis has been placed on solid compositions wherein the active ingredient is mixed with an edible carrier in a feed supplement, in a so-called premix or in the final poultry feedstuff. This is the preferred method of administering the tetrazole of this invention. An alternate method of treatment is to dissolve or suspend the cinerubin coccidiostat in the drinking water of the animals. The quantity of coccidiostat which may be administered in this fashion is, of course, limited by the solubility of the product in water or by the quantity that may be suspended in the water without undue settling. Emulsifiers or surface active agents may be employed for this latter purpose. The preferred level in water is about one-half that employed in feed or about 0.0005 to 0.0015% since poultry tend to drink twice what they eat.

This invention is not limited to coccidiostatic compositions having Cinerubin A or B as the sole active ingredient. Also contemplated within its scope is what might be called "combined treatment" where a cinerubin compound and one or more other coccidiostats are administered concurrently. For such purposes, compositions may be prepared containing a cinerubin compound admixed with one or more other coccidiostats such as sulfaquinoxaline, other sulfa compounds, 4,4'-dinitrocarbanilide-2-hydroxy-4,6-dimethylpyrimidine complex, 3,3'-dinitrodiphenyldisulfide, 5-nitrofurfural semicarbazone, amprolium, zoalene, monensin, buquinolate, ethopabate and the like.

It will likewise be understood by those skilled in this art that special feed supplement formulations and finished animal feeds containing vitamins, antibiotics, growth-promoting agents and other nutritional substances may include the cinerubin compound of this invention. A typical product of this type is the following:

| Ingredient: | Amount/lb. of Supplement, grams |
|---|---|
| Riboflavin | 0.64 |
| DL-calcium pantothenate | 2.10 |
| Niacin | 3.67 |
| Choline chloride | 50.00 |
| Vitamin $B_{12}$ concentrate | 1.30 mg. |

-Continued

| | Amount/lb. of Supplement, grams |
|---|---|
| Procaine penicillin | 0.84 |
| Vitamin A (100,000 u./g.) | 3.38 |
| Vitamin $D_3$ (200,000 u./g.) | 0.68 |
| Arsanilic acid | 18.36 |
| Butylated hydroxy toluene | 23.15 |
| DL-methionine | 23.15 |
| Cinerubin A | 23.00 |
| Distillers' grains to 1 pound. | |

Animal feed supplements having the following compositions are prepared by intimately mixing the substituted phenyltetrazole and the particular edible solid diluent or diluents:

| | | lbs. |
|---|---|---|
| A. | Cinerubin A | 12.5 |
| | Distillers' dried grains | 87.5 |
| B. | Cinerubin A | 15.0 |
| | Soya mill feed | 45.0 |
| | Fine soya grits | 40.0 |
| C. | Cinerubin A | 5.0 |
| | Molasses solubles | 95.0 |
| D. | Cinerubin A | 15.0 |
| | Corn distillers' grains | 55.0 |
| | Corn germ meal | 30.0 |

These supplements are made by mechanical milling or mixing of the ingredients to insure uniform distribution of the active compound.

The following examples will further serve to illustrate the efficacy of the cinerubin coccidiostats.

EXAMPLE I

*E. acervulina* chicken assay

Three 11-day-old female white leghorns, weighing between 75 to 90 gm. each were maintained on a vitamin supplemented diet (Pennfield 180) containing the sample to be tested. One day later, each chicken was orally inoculated with $4 \times 10^5$ sporulated oocysts of *E. acervulina* and maintained on the same diet for five more days. Weights of each of the birds were recorded on days 1, 3, 5, 6 and 7 during the assay; the rate of weight gains during days 1 to 5 ($B_1$) was a parameter of drug toxicity, whereas growth rate from day 5 to day 7 ($B_2$) reflected the *E. acervulina* infection. Serum was collected from each chicken through cardiac puncture on the final day of the assay. The serum albumin level was measured and used as another indicator of coccidial infection. The internal duodenal lesions of each chicken were also examined and the scores were the third parameter of *E. acervulina* infection. All the data were then pooled to produce an anti-*E. acervulina* index as the final judgment of the extent of infection. The formula to calculate the index is as follows:

($B_2/B_1$) × 100 + % normal serum albumin-lesion score × 10

The results from testing cinerubins in the assay are included in Table I below.

TABLE I

Activities of Combined Cinerubin A and B Against *E. acervulina*

| Doses (%) | B₁ | B₂ | Serum Albumin (% Normal) | Lesion Scores | Anti-*E. a.* Index | Evaluation |
|---|---|---|---|---|---|---|
| 0.0125 | −1.33 | −1.00 | 80.6 | 2.33 | 132 | Active & Severe Wt. Loss |
| 0.0060 | 0.41 | 1.34 | 96.4 | 0.33 | 415 | Active & Poor Wt. Gain |
| 0.0030 | 1.42 | 1.16 | 95.7 | 2.00 | 158 | Active & Poor Wt. Gain |
| 0.0015 | 5.00 | 1.91 | 92.9 | 0.00 | 131 | Active & Fair Wt. Gain |

* B: Weight gains in gm./bird/day

EXAMPLE II

*E. brunetti* chicken assay

The experimental procedure was similar to that of *E. acervulina* assay of Example I, except that $2 \times 10^5$ sporulated oocysts of *E. brunetti* were orally inoculated to each bird. The weighings were carried out on days 1, 5 and 7 and the percentage of weight gains was the indicator of drug toxicity.

Feces were collected on days 6 and 7 and the number of oocysts formed in them reflected the extent of the infection. Evaluations were based on the control data.

TABLE II

Activities of Combined Cinerubin A and B Against *E. Brunetti*

| Doses (%) | % Weight Gain | Oocysts Output ($10^6$/Bird) | Evaluation |
|---|---|---|---|
| 0.0125 | −20.8 | 0 | Active & Severe Weight Loss |
| 0.0060 | +14.4 | 0 | Active & Poor Weight Gain |
| 0.0030 | +16.3 | 0 | Active & Poor Weight Gain |
| 0.0015 | +50.0 | 0.33 | Active & Good Weight Gain |
| 0.0015 | +31.3 | 0 | Active & Fair Weight Gain |
| 0.0008 | +46.3 | 5.83 | Inactive & Good Weight Gain |

EXAMPLE III

*E. maxima* chicken assay

The assay was similar to that for *E. brunetti* except $2 \times 10^5$ *E. maxima* sporulated oocysts were the inoculum for each chicken and the internal intestinal lesions were scored as another parameter estimating the infection.

TABLE III

Activities of Combined Cinerubin A and B Against *E. maxima*

| Doses (%) | % Weight Gain | Lesion | Oocysts Output ($10^6$/Bird) | Evaluation |
|---|---|---|---|---|
| 0.0125 | −27.1 | 0 | 0 | Active & Severe Weight Loss |
| 0.0060 | +23.6 | 0 | 0 | Active & Poor Weight Gain |
| 0.0030 | +33.7 | 0 | 0 | Active & Fair Weight Gain |
| 0.0015 | +66.2 | 0 | 0 | Active & Good Weight Gain |
| 0.0015 | +49.5 | 0 | 0.17 | Active & Good Weight Gain |
| 0.0008 | +77.5 | 1.33 | 1.50 | Inactive & Good Weight Gain |

EXAMPLE IV

*E. necatrix* chicken assay

The assay procedure was the same as *E. maxima* assay. *E. necatrix* sporulated oocysts were used as inoculum for each chicken.

TABLE IV

Activities of Combined Cinerubin A and B Against *E. necatrix*

| Doses (%) | % Weight Gain | Lesion | Oocysts Output ($10^6$/Bird) | Evaluation |
|---|---|---|---|---|
| 0.0125 | −17.4 | 0 | 0.75 | Active & Severe Weight Loss |
| 0.0060 | +18.6 | 0 | 1.00 | Active & Poor Weight Gain |
| 0.0030 | +41.7 | 0 | 3.00 | Fair Weight Gain |
| 0.0015 | +52.5 | 0 | 3.33 | Moderately Active & Good Weight Gain |
| 0.0015 | +59.3 | 0.33 | 9.33 | Inactive & Good Weight Gain |
| 0.0008 | +54.7 | 0.67 | 5.17 | Inactive & Good Weight Gain |

EXAMPLE V

*E. tenella* three-chicken assay

By a similar experimental procedure, $10^5$ *E. tenella* sporulated oocysts were orally dosed to each chicken. The oocysts output was not followed. Instead, bloody droppings were scored as an indication of infection. The results are as follows:

TABLE V

Activities of Combined Cinerubin A and B Against *E. tenella*

| Doses (%) | % Weight Gain | Lesion | Bloody Droppings | Evaluation |
|---|---|---|---|---|
| 0.0125 | −14.0 | 0 | 0 | Active & Severe Weight Loss |
| 0.0060 | +1.8 | 0 | 0 | Active & Poor Weight Gain |
| 0.0030 | 0 | 0 | 0 | Active & No Weight Gain |
| 0.0015 | +36.6 | 0 | 0 | Active & Fair Weight Gain |
| 0.0015 | +13.8 | 0 | 0 | Active & Fair Weight Gain |
| 0.0008 | +23.4 | 2.33 | 3 | Inactive & Fair Weight Gain |

What is claimed is:

1. A method for the prevention and treatment of coccidiosis in poultry which comprises orally administering to poultry an anti-coccidially effective amount of Cinerubin A, Cinerubin B, or a non-toxic acid addition salt thereof.

2. The method of claim 1 in which said compound is Cinerubin A.

3. The method of claim 1 in which said compound is Cinerubin B.

* * * * *